UNITED STATES PATENT OFFICE.

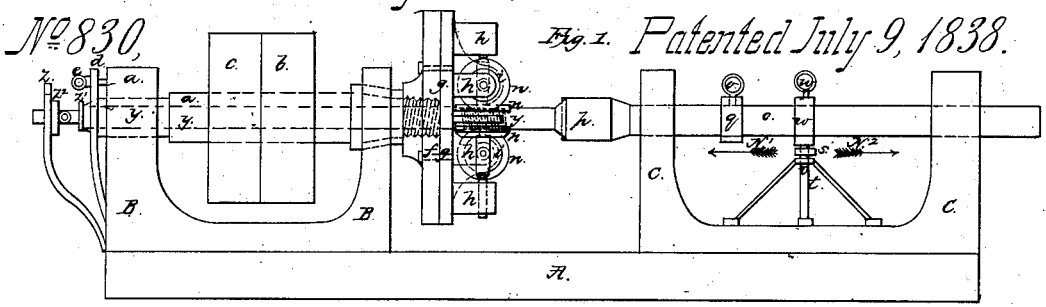
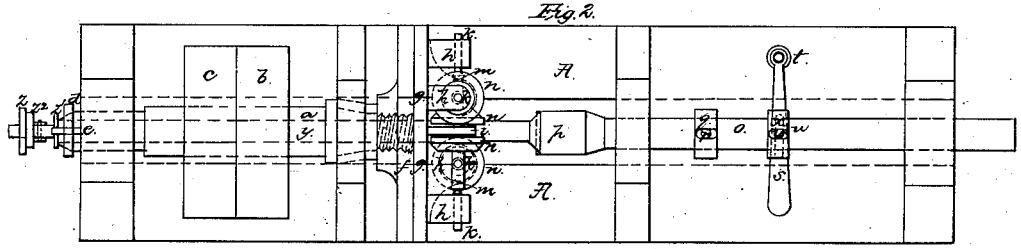
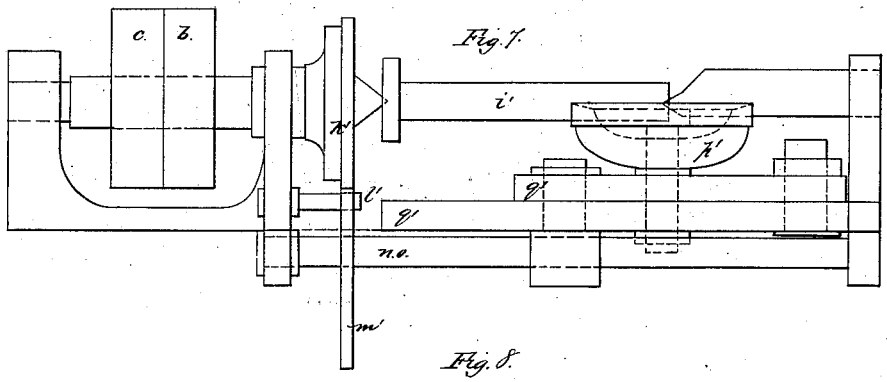
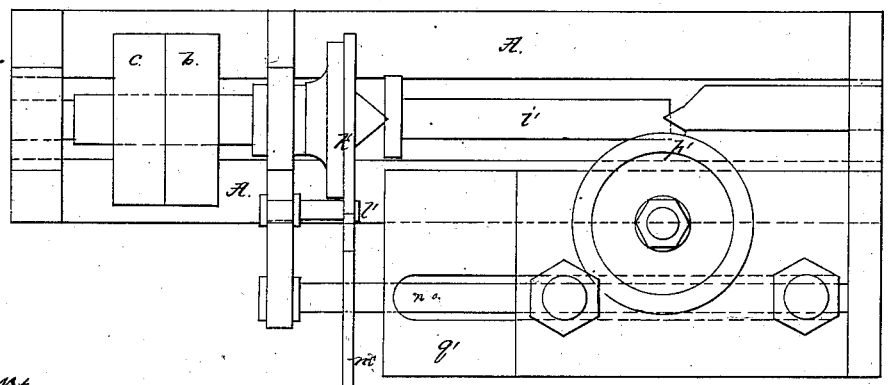

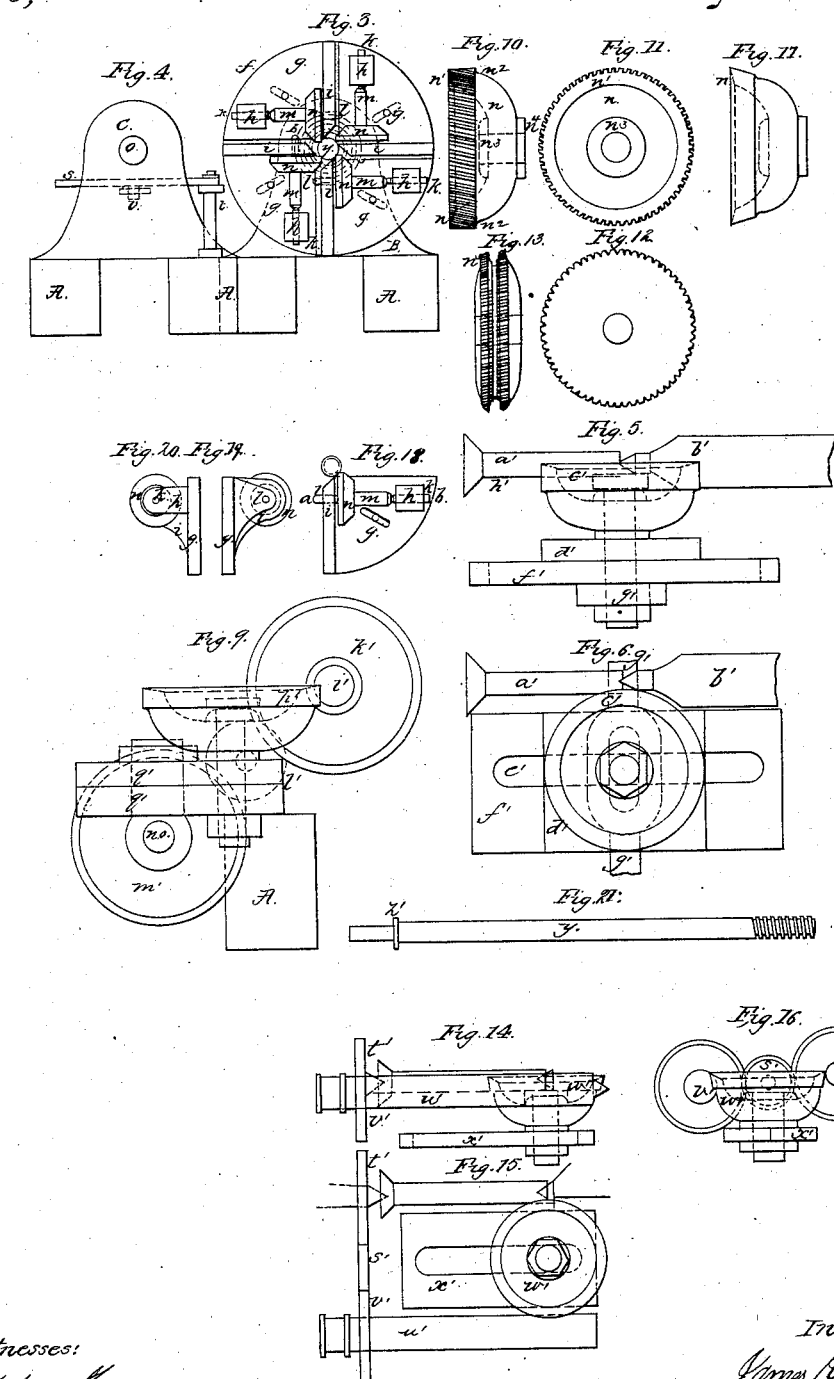
J & T. Keane,
Making Wood Screws,
No. 830.
Patented July 9, 1838.
Sheet 2-2 Sheets
Witnesses:
Stephen Hane
W. Ferrell
Inventors:
James Keane
Thomas Keane

JAMES KEANE AND THOMAS KEANE, OF HAVERSTRAW, NEW YORK.

MACHINE FOR CUTTING WOOD-SCREWS.

Specification of Letters Patent No. 830, dated July 9, 1838.

*To all whom it may concern:*

Be it known that we, JAMES KEANE and THOMAS KEANE, of Haverstraw, in the county of Rockland and State of New York, have invented a new and useful improvement in the mechanical means of cutting the thread or worm on screws used by carpenters and others, commonly called "wood-screws" or "screw-nails," which improved means are equally applicable to cut the thread on screw-bolts of all sizes, for which we seek Letters Patent of the United States, and that the mode of constructing and using the said improvements are fully set forth and shown in the following description and in the drawings annexed to and making a part of this specification, wherein—

Figure 1, is a general sectional elevation, Fig. 2, is a horizontal plan and Fig. 3 is a vertical cross section representing the mechanism of these improvements, as fitted for use and work by us. The other figures in the drawing are consecutively referred to herein for clear explanation, and the same letters or marks of reference apply to the same parts in all the several figures.

A, A, is a pair of bed sheers shown as of wood, but may be made of iron. On these are mounted and fixed at one end the mandrel head B B, and at the other end the puppet head C, C. In the mandrel head is the hollow mandrel $a$, and on it the fast pulley $b$, and loose pulley $c$ the mandrel being kept up to the collar by the back spring $d$ and screw $e$. On the nose of the mandrel is the face chuck $f$, fitted with slots and screws by which to adjust and fasten four carriage plates, $g, g, g, g$, shown direct in Fig. 18, and sectionally in Figs. 19 and 20. On each of these carriage plates is a back lug, $h, h, h, h$, and a face lug $i, i, i, i$, from the outside of the back lugs the back center screws $k, k, k, k$ are tapped in and opposite to these are the fore center scews $l, l, l, l$, tapped through the face lugs and between their points are the small steel shafts or arbors $m, m, m, m$, each standing successively at right angles to each other and carrying each a circular steel chaser wheel $n, n, n, n$, whose edges are parallel to the center and are cut to the space and rake of any required screw thread in parallel lines across the edges in an engine lathe in exactly the same way as the teeth of a worm wheel are usually cut except that the edges are all left as sharp as the metal will work, and the face of the wheel is dished in to give an acute angle to the cutting edge of each tooth when in use as hereafter described and within the first dishing the wheel is again dished more abruptly by which the face $n^1$, can be readily ground by being presented to any fit grinding substance. The direct and sectional form of these wheels is shown in large scale in the detached Figs. 10 and 11. When the edge $n^1$ is dull, grinding that part of the wheel will renew the edge, as long as the substance toward the edge $n^2$ will stand, and the boss $n^3$ being thrown inward allows the edge $n^1$ to come up and be adjusted by the center screws $k$ and $l$, as required, while the thickness of the boss being protruded toward $n^4$ in the opposite direction sustains the wheel steadily on the arbor $m$. On comparing these chaser wheels with the die wheel shown direct in Fig. 12 and in section in Fig. 13, it will be seen that the chaser wheel cuts by a lightly acute angled edge with a succession of teeth which clear themselves of the chips without risk of injury to the teeth or the wheel or the screw, while the die wheel is liable to choke in the groove $n^5$ and split the wheel, or break the screw shaft which is being cut.

In the puppet heads $c$ shown in section in Fig. 4 is fixed the puppet bar $o$ whose end within the machine terminates in a screw driver point $p$. The extent of motion in this bar $o$ is regulated by the sliding collar $q$ and screw $r$, which act as a gage stop, when the puppet bar is moved toward the mandrel by the lever $s$, which has one end on a vertical joint pin in the standard $t$. The lever has a slot $k$ to receive the pin $v$, from the sliding collar $u$, which is to be secured by the screw $w$ at any required point on the bar $o$ and a nut and washer on the pin $v$ below the lever $s$ to keep the lever in a horizontal position, while the slot $x$, in the lever allows the needful lateral motion to slide the bar $o$.

In the hollow tube formed within the mandrel $a$ is the shaft $y$, shown detached in Fig. 21, whose inner end is a leading screw accurately fitted to work with the teeth of the chaser wheels $n, n, n, n$. The back end of this screw shaft is a square which enters a corresponding slotted mortise in the spring $z$, and a small collar $z^1$, keeps the shaft from entering too far into the mandrel tube and a collar and pair of small rollers $z^2$ keep the spring out near the end of the shaft $y$. In this position the screw end of the shaft $y$ will be in gear with the teeth of the wheels $n, n, n, n$, and if motion be given to the mandrel $a$ the shaft $y$ will remain stationary and the wheels $n, n, n, n$, will revolve on their arbors.

If the workman takes a screw shaft which is only headed and notched and holding it by small pliers on the point of the screw driver $p$, in the notch of the screw head forces it by the lever $s$ in the direction of the arrow No. 1, so as to touch and force back the point of the leading screw $y$, the point of the blank shaft will enter between the edges of the wheels $n, n, n, n$, and as they revolve with the chuck and mandrel in the opposite direction to that usually practised the edges of the wheels $n, n, n, n$ will cut a clean thread upon the blank screw shaft while they revolve as if running off the shaft itself, and on the workman returning the lever in the direction of the arrow No. 2, Fig. 1, the leading screw shaft $y$ will return by the power of the spring $z$ and push out the newly cut screw then coming into gear with the chaser teeth. The shaft $y$ will keep them ready to receive another screw shaft and cut it in the same manner. A small stream of water or lubricatory matter is to be kept constantly running on the chaser wheels when in use to prevent them and the screw shaft from heating.

It has been noticed that the chuck is to be driven around in the opposite direction to that usually practised; but if the lugs $h$ and $i$ are placed counterhanded in the carriages $g, g, g, g$, or turned exactly opposite, the wheels $n, n, n, n$, will then stand end for end of the position represented, and the chuck may be driven in the usual direction. In any case the edges of the chaser wheels $n, n, n, n$, must be accurately set or adjusted by the screws and slots in the chuck $f$ and by their own center screws $k$ and $l$ to work at the proper distance from the center of the screw shaft, which will be finished with a thread whose depth will diminish when coming near the upper end and thus leave the substance of the shaft full where the most strength is wanted.

The machine is shown as mounted horizontally, but may be fitted to act vertically if more convenient for any specific place or purpose, and the chuck which carries the chaser wheels may be so mounted as to remain stationary and the shaft of the screw to be cut may be made to revolve when presented between the edges of the chaser wheels which will then produce exactly the same effect, as if the chuck revolved as before described.

If it be desired to finish screws with a sharp entrance or as it is usually termed a gimlet point this may be attained by using after the first cutting a second chuck and set of chasers set nearly together which will cut quite a sharp clean point to a gaged distance on the screw shaft which will then be capable of leading it into any wood of moderate hardness.

When it is wished to cut a screw somewhat larger than usual it may be done as shown in Figs. 5 and 6. The screw $a^1$, being held in any convenient mechanical manner toward the head and made to revolve on the puppet centre $b^1$. The chaser wheel $c^1$ and carriage $d^1$ are made to travel in the slot $e^1$, in the movable slide $f^1$, by a slotted lever $g^1$, in the direction of the arrow $h^1$, and the position of the slide $f^1$, may be so adjusted that the teeth of the chaser wheel $c^1$, shall begin to act at a small depth near the head and finish to a sharp point.

Where it is desired to cut a large screw or bolt, the mode shown in Figs. 7, 8 and 9 may be adopted. The bolt $i^1$ is mounted in a hand or power lathe, the puppet center slide of which must be made of an unequal shape so as to throw the strength behind the center of the slide, and allow the motion of the chaser wheel $p^1$. The chuck $k^1$ has a toothed edge, and gears into an intermediate wheel $l^1$ on a carriage mounted on the mandrel head; this again gears into the tooth wheel $m^1$ on the leading screw, $n$ $o$, of the same thread as the chaser wheel, which leading screw works in the nut on the front edge of the parallel slide rest $q^1$, carrying the chaser wheel $p^1$.

If a slow motion be given to the chuck $k^1$ the leading screw $n$ $o$ will bring the slide rest $q^1$ by a progressive motion toward the mandrel and the chaser teeth coming in contact with the screw bolt will each successively cut a portion of a thread of their own rake on the bolt as the chaser wheel rolls on its own vertical center, and the bolt goes around with the chuck. The chuck may be made as shown in the detached Figs. 14, 15 and 16, to allow of an intermediate small wheel $s^1$ being mounted to gear from the chuck wheel $t^1$ into the leading screw wheel $v^1$ and the leading screw $u^1$ itself gear into the outer edge of the chaser wheel $w^1$ and the parts may all be mounted on bracket bearings with only a slide $x^1$ to guide the chaser wheel up as it cuts, or the motion may be arranged to carry onward the screw shaft that is to be cut. A screw driver nose in the chuck may be used to enter the notch in the head of the screw shaft instead of a driver and carrier in many of the modes in which this means of cutting screw threads is available. The form of the cutting edge on the chaser wheels may be varied to an acute angle instead of being parallel to the center as shown in the detached Fig. 17, and thus the angle may be varied to give any required degree of sharpness according to the density of the metal it is intended to work on.

What we claim as our improvement and as not before known, as we use the same, and for which we seek Letters Patent, is—

1. The mode of forming rotary chaser wheels and mounting them on adjustable carriages so as to fit them for cutting screws or screw bolts of any size with the same rake and pitch of thread and forming said wheels so that they may be ground and sharpened on the face so as to maintain a regular and equal cutting edge; as herein substantially described and set forth.

2. We further claim as new and not known before, as we use and form the same, the formation of the rotary chaser wheel, irrespective of any mode of mounting the same for use, and we lastly claim the several modes of mounting and using said wheels in combination with other mechanical means and appliances, already well known as the same are herein substantially described and set forth.

In witness whereof we have hereunto set our hands this second day of January, one thousand eight hundred and thirty eight.

JAMES KEANE. [L. S.]
THOMAS KEANE. [L. S.]

Witnesses:
STEPHEN KANE,
W. GERRELL.